United States Patent
Seo

(10) Patent No.: US 9,241,126 B2
(45) Date of Patent: Jan. 19, 2016

(54) MEMORY CARD READER DEVICE HAVING TELEVISION BROADCAST SIGNAL RECEPTION FUNCTION

(71) Applicant: SAMSUNG ELECTRO-MECHANICS CO., LTD., Suwon, Gyunggi-do (KR)

(72) Inventor: Won Seo, Gyunggi-do (KR)

(73) Assignee: SAMSUNG ELECTRO-MECHANICS CO., LTD., Suwon, Gyunggi-Do (KR)

(*) Notice: Subject to any disclaimer, the term of this patent is extended or adjusted under 35 U.S.C. 154(b) by 0 days.

(21) Appl. No.: 14/071,123

(22) Filed: Nov. 4, 2013

(65) Prior Publication Data

US 2014/0147094 A1    May 29, 2014

(30) Foreign Application Priority Data

Nov. 23, 2012  (KR) .................. 10-2012-0133607

(51) Int. Cl.
| | |
|---|---|
| H04N 5/85 | (2006.01) |
| H04N 5/775 | (2006.01) |
| H04N 21/4143 | (2011.01) |
| H04N 21/426 | (2011.01) |
| H04N 5/907 | (2006.01) |
| H04N 21/418 | (2011.01) |
| H04N 21/433 | (2011.01) |

(52) U.S. Cl.
CPC .............. *H04N 5/775* (2013.01); *H04N 5/907* (2013.01); *H04N 21/4143* (2013.01); *H04N 21/4184* (2013.01); *H04N 21/42646* (2013.01); *H04N 21/4334* (2013.01)

(58) Field of Classification Search
CPC ....... H04N 5/85; H04N 5/775; H04N 5/4403; H04N 5/907; H04N 9/8042; H04N 9/7921; H04N 21/4113; H04N 21/4334; H04N 21/42646; H04N 21/4184; G11B 27/034
See application file for complete search history.

(56) References Cited

U.S. PATENT DOCUMENTS

| | | | |
|---|---|---|---|
| 2006/0285129 A1* | 12/2006 | Yamaguchi et al. | 358/1.2 |
| 2011/0188608 A1* | 8/2011 | Oba | 375/316 |
| 2013/0076936 A1* | 3/2013 | Yoshida | 348/222.1 |
| 2013/0132740 A1* | 5/2013 | Li | 713/300 |
| 2013/0300213 A1* | 11/2013 | Zhou | 307/115 |

FOREIGN PATENT DOCUMENTS

KR    10-2011-0052969 A    5/2011

* cited by examiner

*Primary Examiner* — William C Vaughn, Jr.
*Assistant Examiner* — Eileen Adams
(74) *Attorney, Agent, or Firm* — McDermott Will & Emery LLP

(57) ABSTRACT

There is provided a memory card reader device including: a memory card reader unit reading data stored on a memory card; a broadcast signal receiving unit receiving a television broadcast signal under control; a main control unit controlling operations of the memory card reader unit and the broadcast signal receiving unit and converting data from the memory card reader unit or a signal from the broadcast signal receiving unit into a signal suitable for a predetermined interface; and a wired connection unit transferring the signal from the main control unit to an external connection device.

8 Claims, 2 Drawing Sheets

MEMORY CARD READER DEVICE HAVING TELEVISION BROADCAST SIGNAL RECEPTION FUNCTION

CROSS-REFERENCE TO RELATED APPLICATION

This application claims the benefit of Korean Patent Application No. 10-2012-0133607 filed on Nov. 23, 2012, with the Korean Intellectual Property Office, the disclosure of which is incorporated herein by reference.

BACKGROUND OF THE INVENTION

1. Field of the Invention

The present invention relates to a memory card reader device, such as a secure digital (SD) memory card reader device, capable of receiving a television broadcast signal.

2. Description of the Related Art

In general, as integrated circuits (ICs) become highly functional and slimmer, digital portable electronic devices have rapidly become prevalent. Examples of portable electronic devices include personal digital assistants (PDA), mobile phones, digital cameras and notebook computers.

Such PDAs, mobile phones, and digital cameras have limited internal memory capacity, and often employ a SD memory card, a type of external memory card. In order to transfer data from a SD memory card to another device, a reader device is necessary.

Existing SD memory card reader devices only read SD memory cards but do not have the function of receiving television broadcast signals.

Patent Document 1 below discloses a secure digital card having the function of receiving television broadcast signals. However, the document does not teach incorporating the function of receiving television broadcast signals into a memory card reader device.

RELATED ART DOCUMENT (Patent Document 1) Korean Patent Laid-Open Publication No. 2011-0052969

SUMMARY OF THE INVENTION

An aspect of the present invention provides a memory card reader device capable of receiving television broadcast signals when it is connected to a host device such as a computer (e.g., a PC) by way of incorporating the function of receiving television broadcast signals into the memory card reader such as a secure digital (SD) memory card reader.

According to an aspect of the present invention, there is provided a memory card reader device including: a memory card reader unit reading data stored on a memory card; a broadcast signal receiving unit receiving a television broadcast signal under control; a main control unit controlling operations of the memory card reader unit and the broadcast signal receiving unit and converting data from the memory card reader unit or a signal from the broadcast signal receiving unit into a signal suitable for a predetermined interface; and a wired connection unit transferring the signal from the main control unit to an external connection device.

The memory card reader device may further include a power supplying unit converting power from the wired connection unit into different forms, each appropriate for one of the memory card reader unit, the broadcast signal receiving unit and the main control unit, so as to supply the converted power.

The memory card reader unit may include a memory card connection unit having a plurality of connection pins for an electrical connection with the memory card; and a card control unit reading data stored on the memory card via the memory card connection unit.

The memory card connection unit may include a plurality of connection pins for connection with a SD memory card.

The predetermined interface may include a wired USB interface having power pins, positive data pins, negative data pins and ground pins.

The wired connection unit may be a wired USB connection port.

The main control unit may control operations of the memory card reader unit and the broadcast signal receiving unit using the external connection device via the wired connection unit.

The main control unit may convert data from the memory card reader unit or a signal from the broadcast signal receiving unit into a signal suitable for a predetermined interface, so as to provide the converted signal to the external connection device via the wired connection unit.

The broadcast signal receiving unit may include: an RF circuit unit passing and amplifying a signal in a corresponding broadcast band among RF signals coming through an antenna under the control of the main control unit; a conversion unit converting an RF signal of the corresponding broadcast band into an IF signal under the control of the main control unit; and an IF circuit unit passing and amplifying the IF signal from the conversion unit under the control of the main control unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
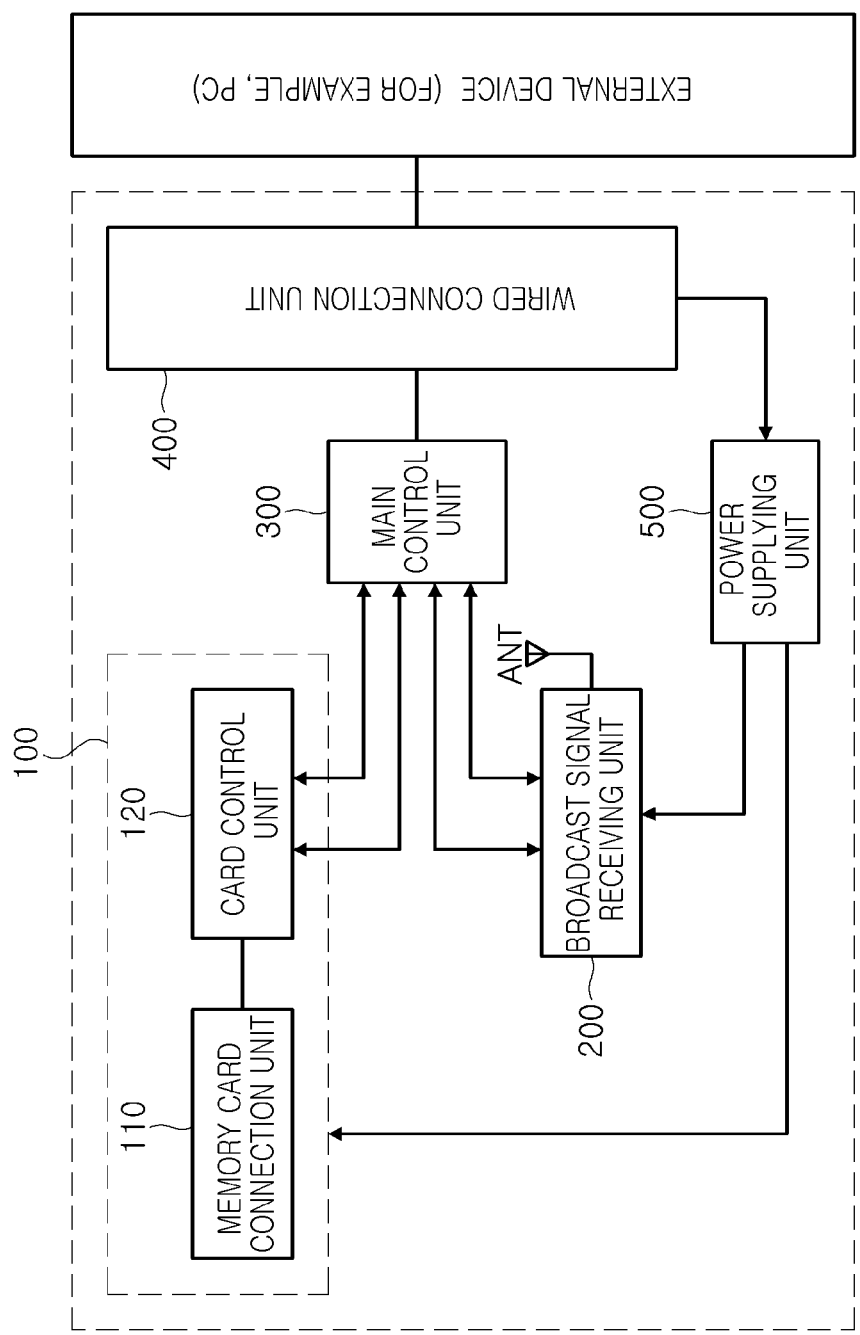
FIG. 1 is a block diagram of a memory card reader device according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. Throughout the drawings, the same or like reference numerals will be used to designate the same or like elements.

FIG. 1 is a block diagram of a memory card reader device according to an embodiment of the present invention.

Referring to FIG. 1, the memory card reader device according to the embodiment of the present invention may include a memory card reader unit 100, a broadcast signal receiving unit 200, a main control unit 300, and a wired connection unit 400.

The memory card reader device according to the embodiment of the present invention may further include a power supplying unit 500.

The power supplying unit 500 may convert power from the wired connection unit 400 into different forms, each appropriate for one of the memory card reader unit 100, the broadcast signal receiving unit 200 and the main control unit 300, to supply them with the converted power.

Here, the memory card reader unit 100, the broadcast signal receiving unit 200 and the main control unit 300 may require different forms of power.

In such a case, the power supply unit 500 may supply different forms of power as required by each of the memory card reader unit 100, the broadcast signal receiving unit 200 and the main control unit 300.

The memory card reader unit 100 may read data stored on a memory card under the control of the main control unit 300 so as to provide the data to the main control unit 300 for provision to an external connection device.

As an exemplary implementation, the memory card reader unit 100 may include a memory card connection unit 110 and a card control unit 120.

The memory card connection unit 110 may include a plurality of connection pins for an electrical connection with the memory card. The card control unit 120 may read data stored on the memory card under the control of the main control unit 300 via the memory card connection unit 110 so as to provide it to the main control unit 300.

In addition, the memory card connection unit 110 may include a plurality of connection pins for connection with a SD memory card. The connection pins for connection with a SD memory card may include data pins, command pins, clock pins, power pins and ground pins. An SD memory card may be connected to the memory card connection unit 110, but other memory cards also may be connected.

In this regard, the secure digital (SD) memory card has a flash (non-volatile) memory card format for use in portable devices such as digital cameras, hand-held computers, PDAs, GPS devices produced by Matsushita, SanDisk and Toshiba. As of 2011, the capacity of SD cards may be 8 megabytes to 2 terabytes. Cards with capacities from 4 to 32 gigabytes are supported by the SD high capacity (SDHC) format, and cards with capacity of above 64 gigabytes are supported by the SD extended capacity (SDXC) format.

The broadcast signal receiving unit 200 may receive television broadcast signals under the control of the main control unit 300. The broadcast signal receiving unit 200 will be described with reference to FIG. 2.

Figure 2:
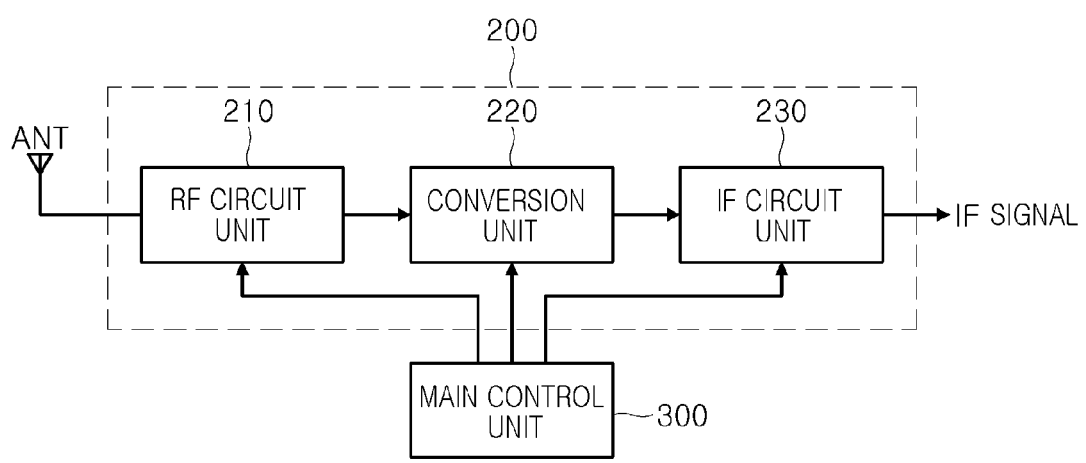
FIG. 2 is a block diagram of a broadcast signal receiving unit according to an embodiment of the present invention.

FIG. 2 is a block diagram of a broadcast signal receiving unit according to an embodiment of the present invention.

Referring to FIG. 2, the broadcast signal receiving unit 200 may include an RF circuit unit 210, a conversion unit 220, and an IF circuit unit 230.

The RF circuit unit 210 may pass a signal in a corresponding broadcast band among high frequency (RF) signals via an antenna ANT to the conversion unit 220 under the control of the main control unit 300. In addition, the RF circuit unit 210 may amplify a corresponding broadcast band if a received RF signal is weak.

The antenna ANT may be, but is not limited to, a chip antenna or a built-in antenna formed of patterns on a board.

In addition, in order to improve selectivity of RF signals, the RF circuit unit 210 may include a variable filter. In this case, the variable filer may vary a pass band under the control of the main control unit 300 to remove noise in an RF signal and pass a signal in a band suitable for a selected channel.

In addition, in order to improve reception sensitivity of RF signals, the RF circuit unit 210 may include an automatic gain control amplifier (e.g., an RF AGC amplifier). In this case, the RF AGC amplifier may automatically adjust an amplification factor according to the strength of a received RF signal, and thus the RF circuit unit 210 may maintain the strength of the received RF signal at an appropriate level.

The conversion unit 220 may convert an RF signal of a corresponding broadcast band into an intermediate frequency (IF) signal under the control of the main control unit 300. That is, the conversion unit 220 converts an RF signal at a higher frequency into an IF signal at a lower frequency which can be processed by the IF circuit unit 230.

The conversion scheme of the conversion unit 220 may include a super-heterodyne scheme, a double conversion scheme, and a single conversion scheme. However, the present invention is not limited thereto and may employ any conversion scheme known in the art.

The IF circuit unit 230 may pass an IF signal from the conversion unit 220 under the control of the main control unit 300 so as to provide it to external connection devices such as a PC via the main control unit 300 and the wired connection unit 400. In addition, the IF circuit unit 230 may amplify a corresponding broadcast band if an IF signal from the conversion unit 220 is weak.

Further, the IF circuit unit 230 may include an automatic gain control amplifier (e.g., an IF AGC amplifier). In this case, the IF AGC amplifier may automatically adjust an amplification factor according to the strength of an IF signal from the conversion unit 220, and thus the IF circuit unit 230 may maintain the strength of the IF signal at an appropriate level.

For example, if the external connection device is a computer and the computer is connected to the memory card reader device according to the embodiment of the present invention, it is possible to watch or record a television broadcast on the computer using the memory card reader device.

Subsequently, referring to FIGS. 1 and 2, the main control unit 300 may control the operations of the memory card reader unit 100 and the broadcast signal receiving unit 200.

Further, the main control unit 300 may convert data from the memory card reader unit 100 or a signal from the broadcast signal receiving unit 200 into a signal suitable for a predetermined interface.

The predetermined interface may include a wired USB interface having power pins, positive data pins, negative data pins and ground pins. However, the wired USB interface is merely an example, and the present invention is not limited thereto.

The wired connection unit 400 may transmit a signal from the main control unit 300 to an external connection device. For example, the wired connection unit 400 may be a wired USB connection port.

Accordingly, the main control unit 300 may control the operations of the memory card reader unit 100 and the broadcast signal receiving unit 200 using the external connection device via the wired connection unit 400.

Further, the main control unit 300 may convert data from the memory card reader unit 100 or a signal from the broadcast signal receiving unit 200 into a signal suitable for a predetermined interface, so as to provide it to the external connection device via the wired connection unit 400.

On the other hand, the external connection device may be a computer apparatus such as a PC (referred to hereinafter as a computer) to which the memory card reader device according to the embodiment of the present invention can be connected. The computer may control the functions of reading memory cards and receiving broadcast signals using the memory card reader device when a software program for controlling the operation of the memory card reader device.

As set forth above, according to the embodiments of the present invention, a memory card reader device can receive television broadcast signals when it is connected to a host device such as a computer (e.g., a PC) by way of incorporating the function of receiving television broadcast signals into the memory card reader such as a secure digital (SD) memory card reader.

While the present invention has been shown and described in connection with the embodiments, it will be apparent to those skilled in the art that modifications and variations can be made without departing from the spirit and scope of the invention as defined by the appended claims.

What is claimed is:

1. A memory card reader device comprising:
   a memory card reader unit reading data stored on a memory card;
   a broadcast signal receiving unit receiving a television broadcast signal under control;
   a main control unit controlling operations of the memory card reader unit and the broadcast signal receiving unit and converting data from the memory card reader unit or a signal from the broadcast signal receiving unit into a signal suitable for a predetermined interface; and
   a wired connection unit transferring the signal from the main control unit to an external connection device,
   wherein the broadcast signal receiving unit includes:
   an RF circuit unit passing and amplifying a signal in a corresponding broadcast band among RF signals coming through an antenna under the control of the main control unit;
   a conversion unit converting an RF signal of the corresponding broadcast band into an IF signal under the control of the main control unit; and
   an IF circuit unit passing and amplifying the IF signal from the conversion unit under the control of the main control unit,
   wherein the RF circuit unit includes an automatic gain control amplifier adjusting an amplification factor according to the strength of a received RF signal and maintaining the strength of the received RF signal at an appropriate level.

2. The memory card reader device of claim 1, further comprising a power supplying unit converting power from the wired connection unit into different forms, each appropriate for one of the memory card reader unit, the broadcast signal receiving unit and the main control unit, so as to supply the converted power.

3. The memory card reader device of claim 1, wherein the memory card reader unit includes:
   a memory card connection unit having a plurality of connection pins for an electrical connection with the memory card; and
   a card control unit reading data stored on the memory card via the memory card connection unit.

4. The memory card reader device of claim 3, wherein the memory card connection unit includes a plurality of connection pins for connection with a SD memory card.

5. The memory card reader device of claim 1, wherein the predetermined interface is a wired USB interface having power pins, positive data pins, negative data pins and ground pins.

6. The memory card reader device of claim 1, wherein the wired connection unit is a wired USB connection port.

7. The memory card reader device of claim 1, wherein the main control unit controls operation of the memory card reader unit and the broadcast signal receiving unit using the external connection device via the wired connection unit.

8. A memory card reader device comprising:
   a memory card reader unit reading data stored on a memory card;
   a broadcast signal receiving unit receiving a television broadcast signal under control;
   a main control unit controlling operations of the memory card reader unit and the broadcast signal receiving unit and converting data from the memory card reader unit or a signal from the broadcast signal receiving unit into a signal suitable for a predetermined interface; and
   a wired connection unit transferring the signal from the main control unit to an external connection device,
   wherein the main control unit converts data from the memory card reader unit or a signal from the broadcast signal receiving unit into a signal suitable for a predetermined interface, so as to provide the converted signal to the external connection device via the wired connection unit,
   wherein the broadcast signal receiving unit includes:
   an RF circuit unit passing and amplifying a signal in a corresponding broadcast band among RF signals coming through an antenna under the control of the main control unit;
   a conversion unit converting an RF signal of the corresponding broadcast band into an IF signal under the control of the main control unit; and
   an IF circuit unit passing and amplifying the IF signal from the conversion unit under the control of the main control unit,
   wherein the RF circuit unit includes an automatic gain control amplifier adjusting an amplification factor according to the strength of a received RF signal and maintaining the strength of the received RF signal at an appropriate level.

* * * * *